(12) United States Patent
Nishida (10) Patent No.: US 8,289,000 B2
(45) Date of Patent: Oct. 16, 2012

(54) CHARGE CONTROL CIRCUIT (75) Inventor: Junji Nishida, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 476 days.

(21) Appl. No.: 12/666,136

(22) PCT Filed: Sep. 1, 2008

(86) PCT No.: PCT/JP2008/066136
§ 371 (c)(1),
(2), (4) Date: Dec. 22, 2009

(87) PCT Pub. No.: WO2009/031673
PCT Pub. Date: Mar. 12, 2009

(65) Prior Publication Data
US 2010/0320973 A1    Dec. 23, 2010

(30) Foreign Application Priority Data
Sep. 6, 2007  (JP) .................................. 2007-231017

(51) Int. Cl.
H02J 7/04    (2006.01)
H02J 7/16    (2006.01)
H02J 7/06    (2006.01)

(52) U.S. Cl. .......................... 320/145; 320/162; 320/163

(58) Field of Classification Search .................. 320/144, 320/145, 160, 162, 163; 323/282–285
See application file for complete search history.

(56) References Cited

U.S. PATENT DOCUMENTS

| | | | |
|---|---|---|---|
| 7,262,587 B2 * | 8/2007 | Takimoto et al. .............. | 323/282 |
| 7,763,345 B2 * | 7/2010 | Chen et al. ................... | 428/195.1 |
| 8,004,248 B2 * | 8/2011 | Mayega et al. ................ | 320/145 |
| 2005/0275388 A1 | 12/2005 | Takimoto et al. | |

FOREIGN PATENT DOCUMENTS

| | | |
|---|---|---|
| JP | 1-157233 | 6/1989 |
| JP | 2005-341769 | 12/2005 |
| JP | 2005-354845 | 12/2005 |
| JP | 2006-246626 | 9/2006 |
| JP | 2007-14163 | 1/2007 |
| JP | 2007-82347 | 3/2007 |
| JP | 2007-110833 | 4/2007 |
| JP | 2007-128116 | 5/2007 |
| JP | 2007-202273 | 8/2007 |
| JP | 2007-202281 | 8/2007 |
| JP | 2007-209103 | 8/2007 |
| JP | 2007-209135 | 8/2007 |
| JP | 2007-209180 | 8/2007 |
| JP | 2007-221872 | 8/2007 |

(Continued)

*Primary Examiner* — Richard V Muralidar (74) *Attorney, Agent, or Firm* — Cooper & Dunham LLP (57) ABSTRACT

When a control circuit detects from a signal CPO4 that a battery voltage is less than a sixth reference voltage, a constant current operation in VFM control is performed with respect to a switching transistor and a synchronous rectification transistor in accordance with signals RVDET and CPO3. Furthermore, when the control circuit detects from the signal CPO4 that the battery voltage becomes equal to or greater than the sixth reference voltage, the constant current operation in PWM control is performed in accordance with a signal CPO2. When an output signal CVDET from a constant current/constant voltage switching detection circuit becomes high level, operation control with respect to the switching transistor and the synchronous rectification transistor is switched from the PWM control of constant current operations to the PWM control of constant voltage operations in accordance with a signal CPO1.

14 Claims, 10 Drawing Sheets

FOREIGN PATENT DOCUMENTS

| | | |
|---|---|---|
| JP | 2007-252137 | 9/2007 |
| JP | 2008-72786 | 3/2008 |
| JP | 2008-72833 | 3/2008 |
| JP | 2008-72835 | 3/2008 |
| JP | 2008-131746 | 6/2008 |
| JP | 2008-131747 | 6/2008 |
| JP | 2008-178263 | 7/2008 |
| JP | 2008-206366 | 9/2008 |
| JP | 2008-228514 | 9/2008 |
| JP | 2009-5442 | 1/2009 |
| JP | 2009-65772 | 3/2009 |
| JP | 2009-71951 | 4/2009 |
| WO | WO 2007/094246 A1 | 8/2007 |

* cited by examiner

CHARGE CONTROL CIRCUIT

TECHNICAL FIELD

The present invention relates to a charge control circuit that charges a secondary battery by using a switching regulator.

BACKGROUND ART

Figure 1:
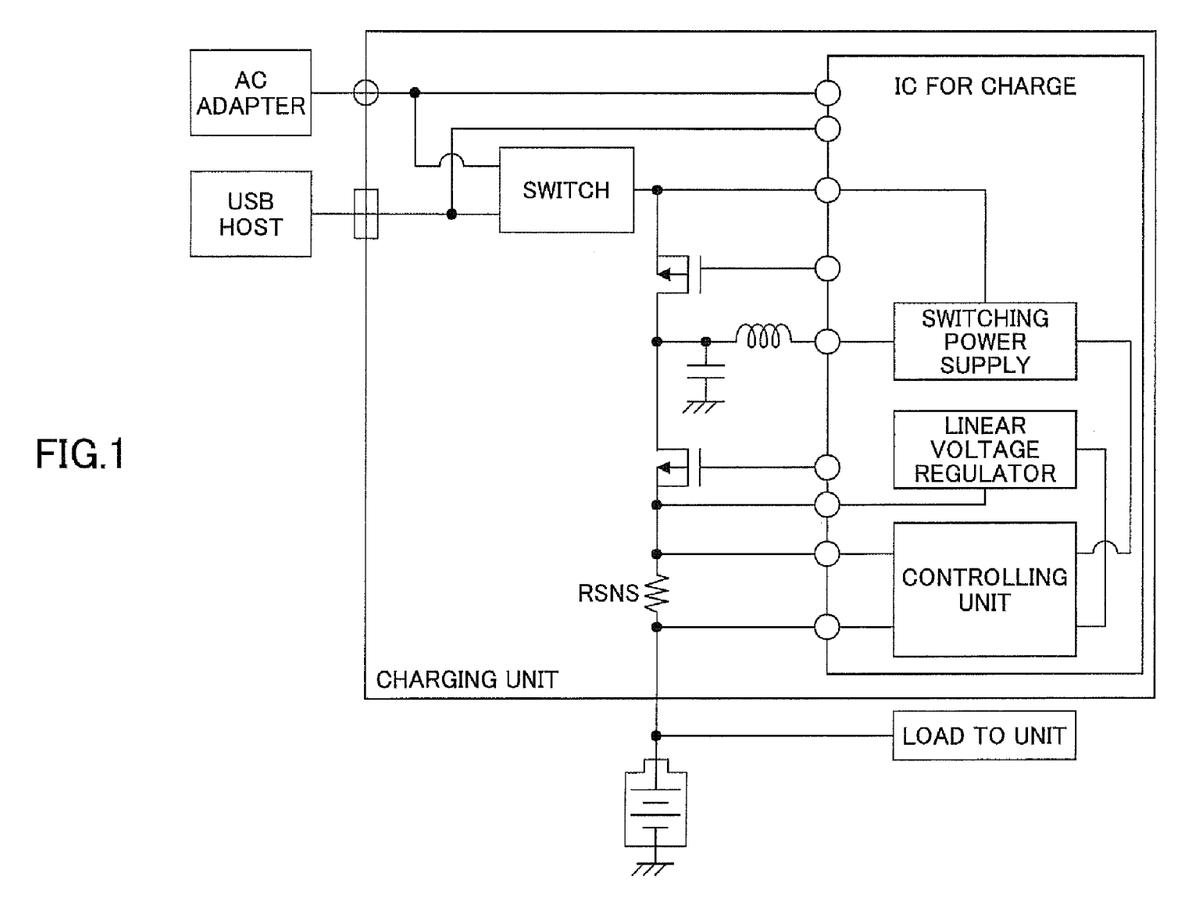
FIG. 1 is a diagram showing an example of a conventional charge control circuit.

FIG. 1 is a diagram showing an example of a conventional charge control circuit that uses a switching power supply and a linear voltage regulator together (see, for example, Patent Document 1).

The charge control circuit shown in FIG. 1 attempts to improve power efficiency by operating either the switching power supply or the linear voltage regulator in a switching manner with the battery voltage of a secondary battery. The detection of a charge current at the time of constant current operations is performed using a voltage difference between both ends of a resistor RSNS connected in series to the secondary battery.

Patent Document 1: JP-A-2007-14163

However, due to the resistor used for detecting the charge current, a current flowing through the resistor disadvantageously causes loss. Moreover, when the resistance value of the resistor is made small to reduce the loss due to the resistor, it is necessary to use a high-accuracy operational amplifier.

DISCLOSURE OF THE INVENTION

The present invention has been made in order to solve such problems and may provide a charge control circuit capable of eliminating the occurrence of loss due to a resistor along with eliminating the resistor for detecting a charge current and attempting to reduce the number of parts.

According to an aspect of the present invention, there is provided a charge control circuit that includes a non-insulated step-down switching regulator using an inductor and charges a secondary battery connected to an output terminal using a voltage input to an input terminal as a power supply. The charge control circuit comprises a switching element that performs a switching operation in accordance with an input control signal and charges the inductor with the input voltage; a rectification element that discharges the inductor; a current detection circuit part that generates a proportional current proportional to a current flowing to the switching element and generates and outputs a current sense voltage corresponding to the proportional current; and a control circuit part that performs PWM control for constant voltage output operations with respect to the switching element in accordance with a current mode control method using the current sense voltage at the time of constant voltage charging in which a constant voltage is supplied to the secondary battery for charging, and performs PWM control for constant current output operations with respect to the switching element at the time of constant current charging in which a constant current is supplied to the secondary battery for charging. The control circuit part compares the current sense voltage with a fourth reference voltage generated by adding a difference voltage between a second predetermined reference voltage and the current sense voltage to the second reference voltage, and performs the PWM control for the constant current output operations using a pulse signal indicating a comparison result.

Preferably, when performing the PWM control for the constant current output operations, the control circuit part may turn on the switching element in accordance with a predetermined clock signal for setting a control cycle of the PWM control to establish an electrical connection and turn off the switching element in accordance with the pulse signal indicating the comparison result to cut off the electrical connection.

Preferably, the control circuit part may turn off the switching element when the current sense voltage becomes equal to or greater than the fourth reference voltage.

Preferably, the control circuit part may have a switched capacitor circuit that generates the fourth reference voltage from the second reference voltage; and a second voltage comparison circuit that compares the current sense voltage with the fourth reference voltage.

Preferably, when performing the PWM control using the current mode control method, the control circuit part may compare a slope voltage generated by compensating for a slope with respect to the current sense voltage using a predetermined method with a voltage corresponding to a difference voltage between a proportional voltage proportional to a battery voltage of the secondary battery and a first predetermined reference voltage, and may perform switching control of the switching element in accordance with a comparison result.

Preferably, the control circuit part may compare a phase of the pulse signal indicating the comparison result of the fourth reference voltage and the current sense voltage with a phase of the pulse signal indicating the comparison result of the slope voltage and the voltage corresponding to the difference voltage between the proportional voltage and the first reference voltage, and may switch from the PWM control for the constant current output operations to the PWM control for the constant voltage output operations when the phases of the pulse signals match each other.

Preferably, the control circuit part further may have a proportional voltage generation circuit that generates and outputs the proportional voltage; an error amplification circuit that amplifies and outputs the difference voltage between the proportional voltage and the first reference voltage; a slope circuit that generates the slope voltage from the current sense voltage and outputs the slope voltage; and a first voltage comparison circuit that compares an output voltage of the error amplification circuit with the slope voltage.

Preferably, the control circuit part may perform VFM control for constant current output operations with respect to the switching element at the time of the constant current charging in which the constant current is supplied to the secondary battery for charging when a voltage of the secondary battery is less than a predetermined value, and may perform the PWM control for the constant current output operations when the voltage of the secondary battery is equal to or greater than the predetermined value.

Preferably, when performing the VFM control, the control circuit part may compare the current sense voltage with a third predetermined reference voltage and turn off the switching element in accordance with a comparison result, and may detect whether an inductor current flowing to the inductor becomes zero and turns on the switching element in accordance with a detection result.

Preferably, the control circuit part may turn off the switching element when the current sense voltage becomes equal to or greater than the third reference voltage and turn on the switching element when a voltage of a joint between the switching element and the inductor exceeds ground potential.

Preferably, the control circuit part may further have a third voltage comparison circuit that compares the current sense voltage with the third reference voltage; and a fourth voltage comparison circuit that compares the voltage of the joint between the switching element and the inductor with ground potential.

Preferably, the control circuit part may turn off the switching element to cut off the electrical connection and supply a predetermined constant current to the secondary battery at the time of the constant current charging in which the constant current is supplied to the secondary battery for charging when the voltage of the secondary battery is less than the predetermined value.

Preferably, the control circuit part may stop supplying the constant current to the secondary battery and perform the PWM control for the constant current output operations when the battery voltage of the secondary battery becomes equal to or greater than the predetermined value.

Preferably, the control circuit part may detect that the charging of the secondary battery is completed when a value obtained by calculating a square root of an inductor current flowing to the inductor when the switching element is turned on is equal to a value obtained by calculating a square root of a predetermined charge completion current setting value.

According to a charge control circuit of the embodiments of the present invention, a control circuit part performs PWM control for constant voltage output operations with respect to a switching element using a current mode control method in which a current sense voltage is used at the time of constant voltage charging in which a constant voltage is supplied to a secondary battery for charging, and the control circuit part performs PWM control for constant current output operations with respect to the switching element at the time of constant current charging in which a constant current is supplied to the secondary battery for charging. The control circuit part compares the current sense voltage with a fourth reference voltage generated by adding a difference voltage between a second predetermined reference voltage and the current sense voltage to the second reference voltage, and the control circuit part performs the PWM control for the constant current output operations using a pulse signal indicating a comparison result. Therefore, the resistors for detecting a charging current are not required, making it possible to reduce the number of parts and eliminate the occurrence of loss due to the current flowing to the resistors.

Furthermore, because switching control is performed both in constant current mode and in constant voltage mode where power losses are caused at the time of a boost charge, etc., it is possible to reduce the power losses.

BEST MODE FOR CARRYING OUT THE INVENTION

Next, referring to the accompanying drawings, a description is made of embodiments of the present invention.

First Embodiment

Figure 2:
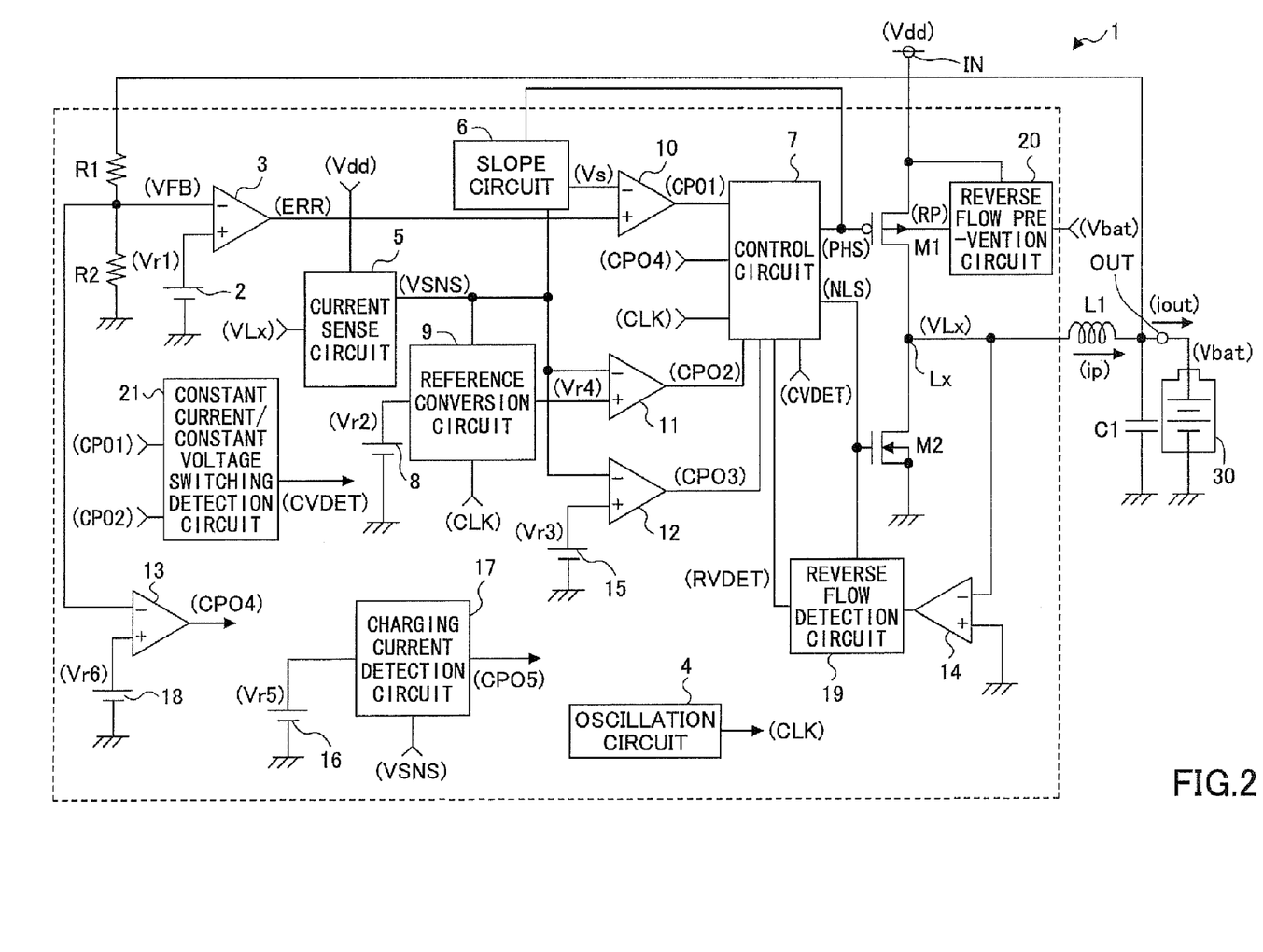
FIG. 2 is a diagram showing a circuit example of a charge control circuit according to a first embodiment of the present invention.

FIG. 2 is a diagram showing a circuit example of a charge control circuit according to a first embodiment of the present invention.

In FIG. 2, a charge control circuit 1 includes a non-insulated step-down switching regulator using an inductor and charges a secondary battery 30 connected to an output terminal OUT using a power supply voltage Vdd input to an input terminal IN from an AC adapter, etc., as a power supply.

The charge control circuit 1 has a switching transistor M1 composed of a PMOS transistor that performs a switching operation for the output control of the power supply voltage Vdd, a synchronous rectification transistor M2 composed of an NMOS transistor, an inductor L1, and a capacitor C1.

In addition, the charge control circuit 1 has a reference voltage generation circuit 2 that generates and outputs a first predetermined reference voltage Vr1, an error amplification circuit 3, an oscillation circuit 4 that generates and outputs a predetermined clock signal CLK, a current sense circuit 5, a slope circuit 6, a control circuit 7 that controls the operations of the switching transistor M1 and the synchronous rectification transistor M2, a reference voltage generation circuit 8 that generates and outputs a second predetermined reference voltage Vr2, a reference conversion circuit 9, and comparators 10 through 14. Moreover, the charge control circuit 1 has a reference voltage generation circuit 15 that generates and outputs a third predetermined reference voltage Vr3, a reference voltage generation circuit 16 that generates and outputs a fifth predetermined reference voltage Vr5, a charging current detection circuit 17, a reference voltage generation circuit 18 that generates and outputs a sixth predetermined reference voltage Vr6, a reverse flow detection circuit 19, a reverse flow prevention circuit 20, a constant current/constant voltage switching detection circuit 21, and resistors R1 and R2 for detecting a battery voltage that generates and outputs a divided voltage VFB by dividing a battery voltage Vbat of the secondary battery 30.

Note that the switching transistor M1 constitutes a switching element, the synchronous rectification transistor M2 constitutes a rectification element, and the current sense circuit 5 constitutes a current detection circuit part. The reference voltage generation circuits 2, 8, 15, 16, and 18, the error amplification circuit 3, the oscillation circuit 4, the slope circuit 6, the control circuit 7, the reference conversion circuit 9, the comparators 10 through 14, the charging current detection circuit 17, the reverse flow detection circuit 19, the reverse flow prevention circuit 20, the constant current/constant voltage switching detection circuit 21, and the resistors R1 and R2 constitute a control circuit part. Furthermore, the comparator 10 constitutes a first voltage comparison circuit, the comparator 11 constitutes a second voltage comparison circuit, the resistors R1 and R2 constitute a proportional voltage generation circuit, the comparator 12 constitutes a third voltage comparison circuit, and the comparator 14 constitutes a fourth voltage comparison circuit. Furthermore, in the charge control circuit 1, the respective circuits excluding the inductor L1 and the capacitor C1 may be integrated together onto one IC.

The switching transistor M1 and the synchronous rectification transistor M2 are connected in series between the input terminal IN and ground potential. The joint between the switching transistor M1 and the synchronous rectification transistor M2 is represented as "Lx." The inductor L1 is connected between the joint Lx and the output terminal OUT, and the series circuit of the resistors R1 and R2 and the capacitor C1 are connected in parallel between the output terminal OUT and ground potential. The divided voltage VFB as the voltage of the joint between the resistors R1 and R2 is input to the inverting input terminal of the error amplification circuit 3, while the first reference voltage Vr1 is input to the non-inverting input terminal of the error amplification circuit 3. The error amplification circuit 3 generates and outputs an error signal ERR by amplifying a difference voltage between the divided voltage VFB and the first reference voltage Vr1. On the other hand, a voltage VLx as the voltage of the joint Lx and a control signal PHS to be input to the gate of the switching transistor M1 are input to the current sense circuit 5. The current sense circuit 5 detects a current flowing to the switching transistor M1 while the switching transistor M1 is turned on and then generates and outputs a current sense voltage VSNS by converting the detected current into a voltage.

The current sense voltage VSNS is input from the current sense circuit 5 to the slope circuit 6. The slope circuit 6 compensates for a slope to generate and output a slope voltage Vs by adding a primary slope compensation voltage for controlling a peak current as the peak value of an inductor current ip flowing to the inductor L1 to the current sense voltage VSNS input from the current sense circuit 5. The error signal ERR from the error amplification circuit 3 is input to the non-inverting input terminal of the comparator 10, while the slope voltage Vs output from the slope circuit 6 is input to the inverting input terminal of the comparator 10. The comparator 10 compares the voltage of the error signal ERR with that of the slope voltage Vs. Then, the comparator 10 generates a signal CPO1 indicating the comparison result and outputs the same to the control circuit 7. The control circuit 7 outputs the control signal PHS and a control signal NLS to the gates of the switching transistor M1 and the synchronous rectification transistor M2, respectively, so as to control the operations of the switching transistor M1 and the synchronous rectification transistor M2.

Next, the current sense voltage VSNS from the current sense circuit 5, the second reference voltage Vr2 from the reference voltage generation circuit 8, and the clock signal CLK from the oscillation circuit 4 are input to the reference conversion circuit 9. The reference conversion circuit 9 adds a difference voltage between the current sense voltage VSNS and the second reference voltage Vr2 to the second reference voltage Vr2 so as to generate and output a fourth reference voltage Vr4. The fourth reference voltage Vr4 is input to the non-inverting input terminal of the comparator 11, while the current sense voltage VSNS is input to the inverting input terminal of the comparator 11. The comparator 11 compares the fourth reference voltage Vr4 with the current sense voltage VSNS. Accordingly, the comparator 11 generates a signal CPO2 indicating the comparison result and outputs the same to the control circuit 7. The third reference voltage Vr3 is input to the non-inverting input terminal of the comparator 12, while the current sense voltage VSNS is input to the inverting input terminal of the comparator 12. The comparator 12 compares the third reference voltage Vr3 with the current sense voltage VSNS. Accordingly, the comparator 12 generates a signal CPO3 indicating the comparison result and outputs the same to the control circuit 7.

The sixth reference voltage Vr6 is input to the non-inverting input terminal of the comparator 13, while the divided voltage VFB is input to the inverting input terminal of the comparator 13. The comparator 13 compares the sixth reference voltage Vr6 with the divided voltage VFB. Accordingly, the comparator 13 generates a signal CPO4 indicating the comparison result and outputs the same to the control circuit 7. The fifth reference voltage Vr5 is input to the charging current detection circuit 17 simultaneously with the input of the current sense voltage VSNS from the current sense circuit 5. Accordingly, the charging current detection circuit 17 generates and outputs a charge completion detection signal CPO5. The voltage VLx is connected to the inverting input terminal of the comparator 14, while ground potential is input to the non-inverting input terminal of the comparator 14. When the voltage VLx becomes equal to or less than ground potential, the comparator 14 outputs a high level signal. The reverse flow detection circuit 19 detects whether the inductor current ip becomes zero from the output signal of the comparator 14 and the control signal NLS input to the gate of the synchronous rectification transistor M2. Accordingly, the reverse flow detection circuit 19 generates a signal RVDET indicating the detection result and outputs the same to the control circuit 7.

The reverse flow prevention circuit 20 compares the power supply voltage Vdd as a primary voltage with the battery voltage Vbat as a secondary voltage. When the battery voltage Vbat becomes greater than the power supply voltage Vdd, the reverse flow prevention circuit 20 controls the connection of the substrate gate of the switching transistor M1 to prevent the flow of a current from the secondary battery 30 to the power supply voltage Vdd. The signals CPO1 and CPO2 are input to the constant current/constant voltage switching detection circuit 21. The constant current/constant voltage switching detection circuit 21 compares the phase of the signal CPO1 with that of the signal CPO2. Accordingly, the constant current/constant voltage switching detection circuit 21 generates a signal CVDET indicating the comparison result and outputs the same to the control circuit 7.

Figure 3:
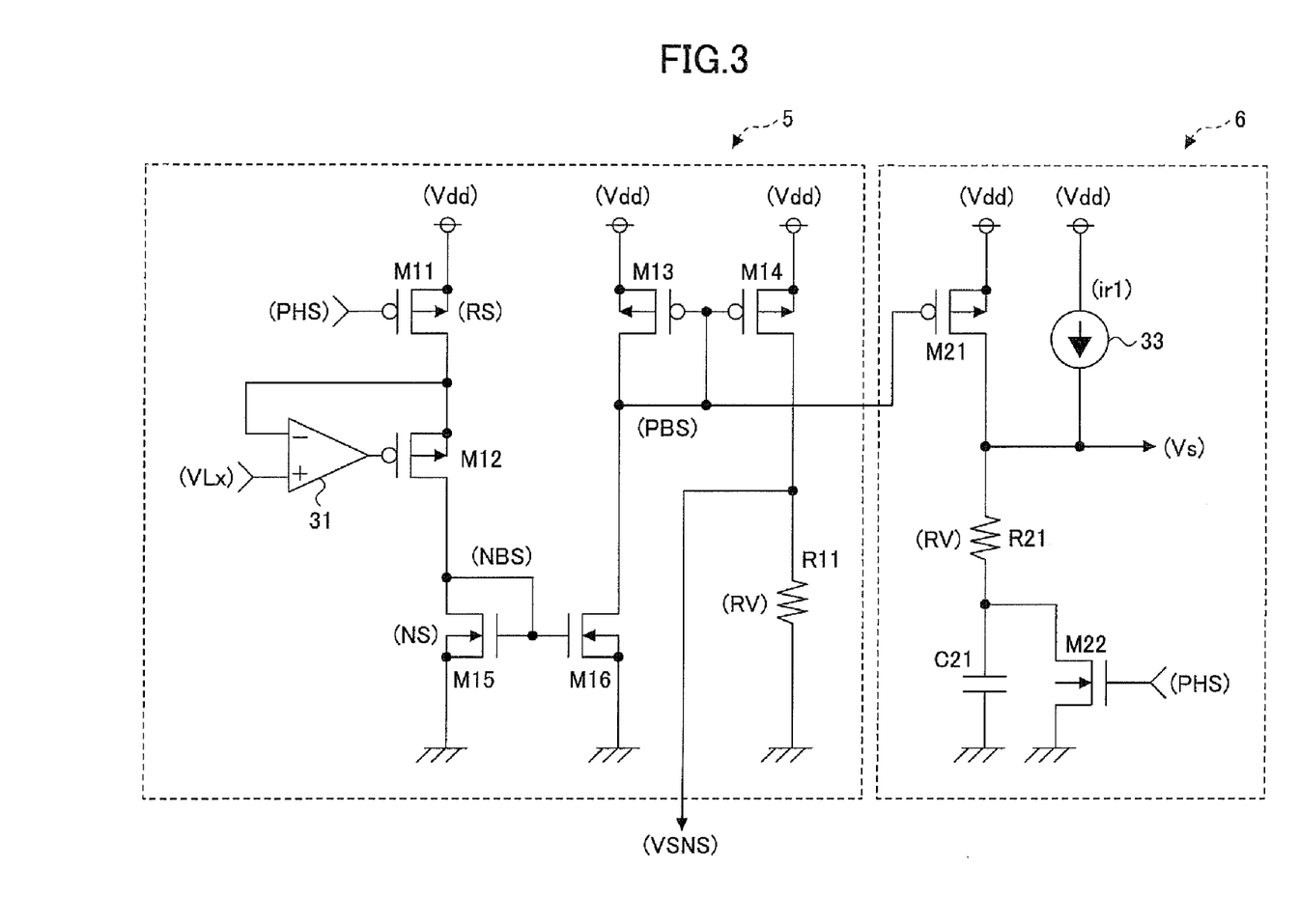
FIG. 3 is a diagram showing circuit examples of a current sense circuit 5 and a slope circuit 6.

FIG. 3 is a diagram showing circuit examples of the current sense circuit 5 and the slope circuit 6.

The current sense circuit 5 is composed of an operational amplifier 31, PMOS transistors M11 through M14, NMOS transistors M15 and M16, and a resistor R11.

The slope circuit 6 is composed of a constant current source 33 that supplies a predetermined constant current ir1, a PMOS transistor M21, an NMOS transistor M22, a capacitor C21, and a resistor R21. Note that FIG. 2 exemplifies a case in which a bias voltage PBS corresponding to the current sense voltage VSNS is input from the current sense circuit 5 to the slope circuit 6 instead of the current sense voltage VSNS.

In the current sense circuit 5, the PMOS transistor M11 is connected between the power supply voltage Vdd and the source of the PMOS transistor M12, and the control signal PHS is input to the gate of the PMOS transistor M11. The NMOS transistor M15 is connected between the drain of the PMOS transistor M12 and ground potential, and the joint between the PMOS transistors M11 and M12 is connected to the inverting input terminal of the operational amplifier 31. The voltage VLx is input to the non-inverting input terminal of the operational amplifier 31, and the output terminal of the operational amplifier 31 is connected to the gate of the PMOS transistor M12. The NMOS transistors M15 and M16 constitute a current mirror circuit. The sources of the NMOS transistors M15 and M16 are connected to ground potential, while the gates of the NMOS transistors M15 and M16 are connected to the drain of the NMOS transistor M15. The voltage of the joint between the gates constitutes a bias voltage NBS.

The PMOS transistors M13 and M14 constitute a current mirror circuit. The sources of the PMOS transistors M13 and M14 are connected to the power supply voltage Vdd, while the gates of the PMOS transistors M13 and M14 are connected to the drain of the PMOS transistor M13. The voltage of the joint between the gates constitutes a bias voltage PBS. The drain of the PMOS transistor M13 is connected to the drain of the NMOS transistor M16, and a resistor R11 is connected between the drain of the PMOS transistor M14 and ground potential. The current sense voltage VSNS is output from the joint between the PMOS transistor M14 and the resistor R11.

Here, assuming that the on-resistance of the switching transistor M1 is represented as "RP," the current value of the inductor current ip to flow when the switching transistor M1 is turned on is represented as "ipeak," the on-resistance of the PMOS transistor M11 is represented as "RS," the resistance value of the resistor R11 is represented as "RV," and the threshold voltage of the NMOS transistor M15 is represented as "Vthn," the current sense voltage VSNS and the bias voltage NBS are expressed by the following formulae (1) and (2), respectively.

$$VSNS = ipeak \times RP/RS \times RV \quad (3)$$

$$NBS = (ipeak \times RP/RS)^{1/2} + Vthn \quad (2)$$

Next, in the slope circuit 6, the PMOS transistor M21, the resistor R21, and the capacitor C21 are connected in series between the power supply voltage Vdd and ground potential. In addition, the constant current source 33 is connected in parallel with the PMOS transistor M21, and the NMOS transistor M22 is connected in parallel with the capacitor C21. The bias voltage PBS is input to the gate of the PMOS transistor M21, and the control signal PHS is input to the gate of the NMOS transistor M22. The slope voltage Vs is output from the joint between the PMOS transistor M21, the resistor R21, and the constant current source 33.

The PMOS transistor M21 constitutes the current mirror circuit together with the PMOS transistors M13 and M14 and generates the slope voltage Vs by synthesizing a primary slope voltage generated by the constant current ir1 from the constant current source 33 and the capacitor C21 with a secondary switching current voltage obtained by converting the current flowing to the switching transistor M1, which is generated by a current mirror current output from the PMOS transistor M21 and the capacitor C21, into a voltage. The resistor R21 generates an input offset voltage with respect to the comparator 10 so as to perform a pulse skip operation at the time of a PWM control operation.

Figure 4:
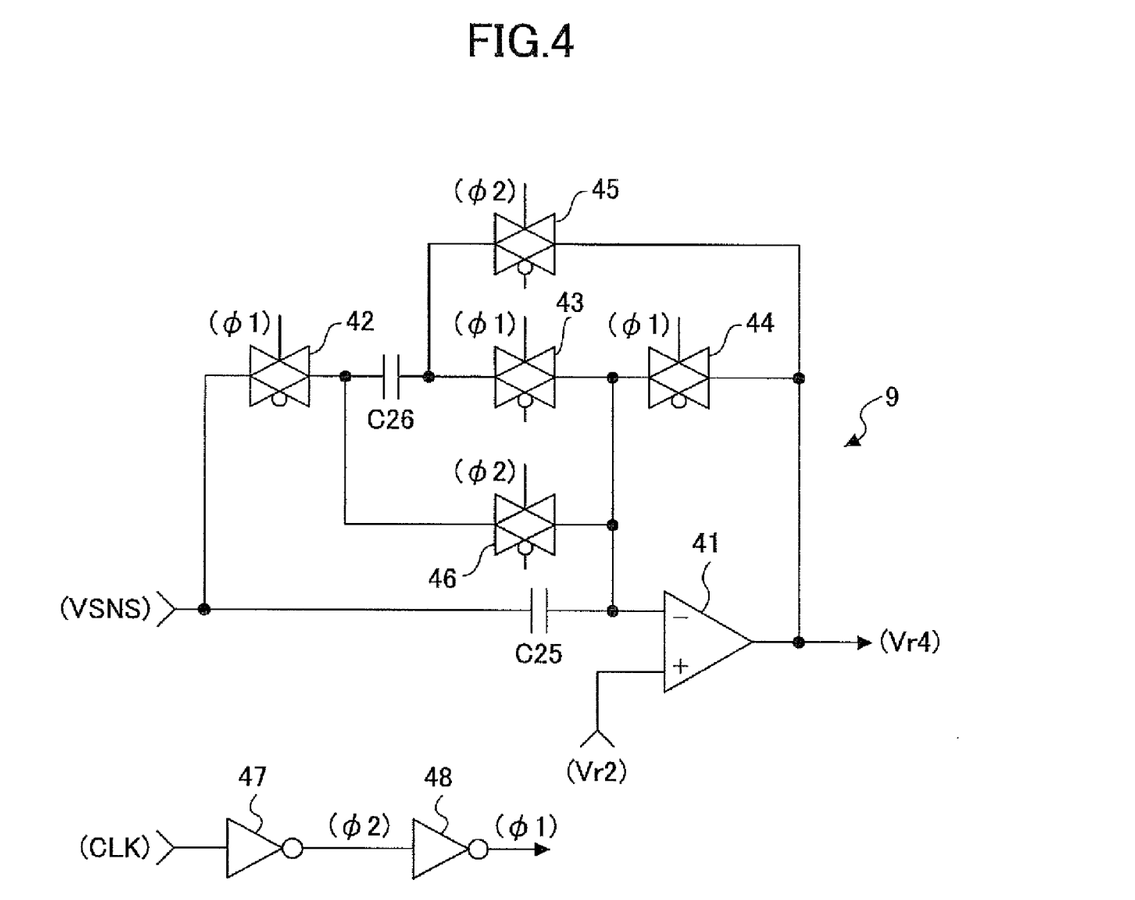
FIG. 4 is a diagram showing a circuit example of a reference conversion circuit 9.

Next, FIG. 4 is a diagram showing a circuit example of the reference conversion circuit 9.

In FIG. 4, the reference conversion circuit 9 constitutes a switched capacitor circuit composed of an operational amplifier 41, analog switches 42 through 46, inverters 47 and 48, and capacitors C25 and C26 having the same capacity as those of the inverters 47 and 48.

The second reference voltage Vr2 is input to the non-inverting input terminal of the operational amplifier 41, and the capacitor C25 is connected between the current sense voltage VSNS and the inverting input terminal of the operational amplifier 41. The analog switch 42 is connected between one end of the capacitor C26 and the current sense voltage VSNS, and the analog switch 46 is connected between the joint between the capacitor C26 and the analog switch 42 and the inverting input terminal of the operational amplifier 41.

The series circuit of the analog switches 43 and 44 and the analog switch 45 are connected in parallel between the other end of the capacitor C26 and the output terminal of the operational amplifier 41, and the joint between the analog switches 43 and 44 is connected to the inverting input terminal of the operational amplifier 41. The fourth reference voltage Vr4 is output from the output terminal of the operational amplifier 41. The inverter 47 generates and outputs an inverted clock signal φ2 obtained by inverting a signal level of the clock signal CLK, and the inverter 48 generates and outputs a clock signal φ1 obtained by further inverting the signal level of the inverted clock signal φ2. The analog switches 42 through 44 perform a switching operation in accordance with the clock signal φ1, and they are turned on to establish an electrical connection when the clock signal φ1 is at a high level and turned off to cut off the electrical connection when the clock signal φ1 is at a low level. The analog switches 45 and 46 perform a switching operation in accordance with the inverted clock signal φ2, and they are turned on to establish the electrical connection when the inverted clock signal φ2 is at a high level and turned off to cut off the electrical connection when the inverted clock signal φ2 is at a low level.

The reference conversion circuit 9 samples the current sense voltage VSNS when the current of an initial current value i0 flows to the switching transistor M1 and generates the fourth reference voltage Vr4 by adding a voltage difference ΔVS between the second reference voltage Vr2 and the sampled current sense voltage VSNS to the second reference voltage Vr2 when the inverted clock signal φ2 is at a high level. Accordingly, the fourth reference voltage Vr4 is expressed by the following formula (3).

$$Vr4 = Vr2 + \Delta VS \quad (3)$$

Figure 5:
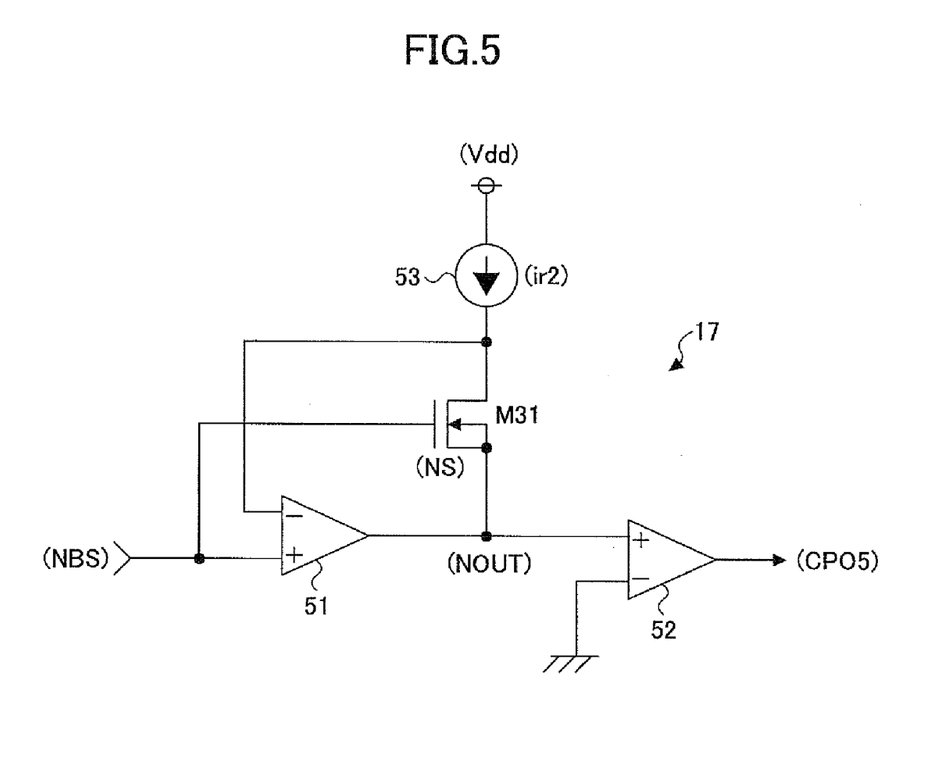
FIG. 5 is a diagram showing a circuit example of a charging current detection circuit 17.

Next, FIG. 5 is a diagram showing a circuit example of the charging current detection circuit 17.

In FIG. 5, the charging current detection circuit 17 is composed of an operational amplifier 51, a comparator 52, a constant current source 53 that supplies a predetermined constant current ir2, and an NMOS transistor M31. Note that FIG. 5 exemplifies a case in which the bias voltage NBS corresponding to the current sense voltage VSNS is input from the current sense circuit 5 to the charging current detection circuit 17 instead of the current sense voltage VSNS.

The bias voltage NBS is input to the non-inverting input terminal of the operational amplifier 51 and the gate of the NMOS transistor M31, and the output terminal of the operational amplifier 51 is connected to the non-inverting input terminal of the comparator 52.

The constant current source 53 is connected between the power supply voltage Vdd and the drain of the NMOS transistor M31, and the joint between the constant current source 53 and the NMOS transistor M31 is connected to the inverting input terminal of the operational amplifier 51. The source of the NMOS transistor M31 is connected to the non-inverting input terminal of the comparator 52, and the inverting input terminal of the comparator 52 is connected to ground potential. The charge completion detection signal CPO5 is output from the output terminal of the comparator 52. Note that in FIG. 5 ground potential connected to the inverting input terminal of the comparator 52 corresponds to the fifth reference voltage Vr5 shown in FIG. 2.

The NMOS transistor M31 is the same as the NMOS transistor M15 in size and constitutes a current mirror circuit together with the NMOS transistors M15 and M16. Assuming that the voltage of the joint between the output terminal of the operational amplifier 51 and the non-inverting input terminal of the comparator 52 is represented as "NOUT," the voltage NOUT is expressed by the following formula (4).

$$NOUT = NBS - Vthn - (ir2)^{1/2} \quad (4)$$

Generally, when detecting a charge completion current, the charge control circuit 1 is operated discontinuously at the time of constant voltage control. Assuming that a switching cycle at the time of PWM control is represented as "T" and the inductance of the inductor L1 is represented as "L," the current value "ipeak" at the discontinuous operation is expressed by the following formula (5).

$$ipeak = Vbat/L \times \{2 \times L \times T \times (Vbat - Vdd) \times iout/(Vdd \times Vbat)\}^{1/2} \quad (5)$$

Because the power supply voltage Vdd and the battery voltage Vbat are generally regarded as fixed values in the case of a charging circuit, the above formula (5) can be abbreviated as the following formula (6).

$$ipeak = \alpha \times (\beta \times iout)^{1/2} \quad (6)$$

wherein $\alpha = Vbat/L$ and $\beta = 2 \times L \times T \times (Vbat \times Vdd)/(Vdd \times Vbat)$ Assuming that a charge completion current setting value is represented as "iset," the constant current ir2 is defined to meet the following formula (7).

$$ir2 = \{\alpha \times RP/RS \times (\beta \times iset)^{1/2}\}^{1/2} \quad (7)$$

In accordance with the formulae (2), (4), and (7), the voltage NOUT is expressed by the following formula (8).

$$NOUT = (ipeak \times RP/RS)^{1/2} = \{\alpha \times RP/RS \times (\beta \times iset)^{1/2}\}^{1/2} \quad (8)$$

Because the charge completion detection signal CPO5 is generated after the comparator 52 detects that the voltage NOUT becomes zero, the following formulae can be obtained from the above formula (8).

$$(ipeak \times RP/RS)^{1/2} = \{\alpha \times RP/RS \times (\beta \times iset)^{1/2}\}^{1/2}$$

$$ipeak = \alpha \times (\beta \times iset)^{1/2}$$

The charge completion current setting value iset can be detected in accordance with the current value ipeak. When the charge completion detection signal CPO5 is at a low level, it is detected that the current value ipeak becomes equal to or less than a predetermined iset.

Figure 6:
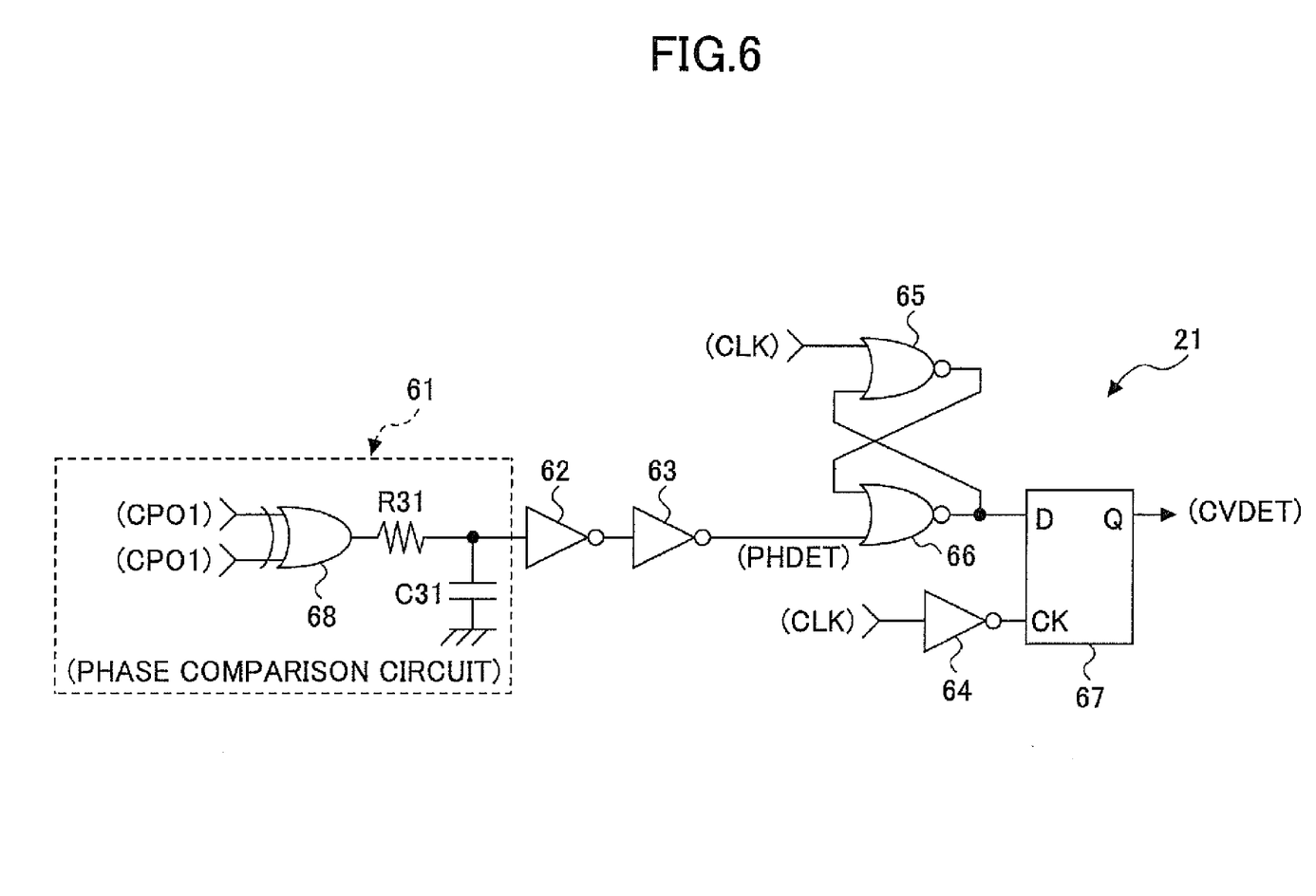
FIG. 6 is a diagram showing a circuit example of a constant current/constant voltage switching detection circuit 21.

Next, FIG. 6 is a diagram showing a circuit example of the constant current/constant voltage switching detection circuit 21.

In FIG. 6, the constant current/constant voltage switching detection circuit 21 is composed of a phase comparison circuit 61, inverters 62 through 64, NOR circuits 65 and 66, and a D-flip-flop 67. The phase comparison circuit 61 is composed of an exclusive OR circuit (hereinafter referred to as an XOR circuit) 68, a resistor R31, and a capacitor C31.

The signals CPO1 and CPO2 are input to the input terminals of the XOR circuit 68, and the resistor R31 and the capacitor C31 are connected in series between the output terminal of the XOR circuit 68 and ground potential.

The inverters 62 and 63 are connected in series between the joint between the resistor R31 and the capacitor C31 and one input terminal of the NOR circuit 66. The signal to be input from the inverter 63 to the NOR circuit 66 is represented as "PHDET." The NOR circuits 65 and 66 constitute an RS-flip-flop circuit. The other input terminal of the NOR circuit 66 is connected to the output terminal of the NOR circuit 65. One input terminal of the NOR circuit 65 is connected to the output terminal of the NOR circuit 66, and the clock signal CLK is input to the other input terminal of the NOR circuit 65. The output terminal of the NOR circuit 66 is connected to the D-input terminal of the D-flip-flop 67, and the clock signal CLK whose signal level is inverted by the inverter 64 is input to the clock input terminal CK of the D-flip-flop 67. The signal CVDET is output from the output terminal Q of the D-flip-flop 67.

Figure 7:
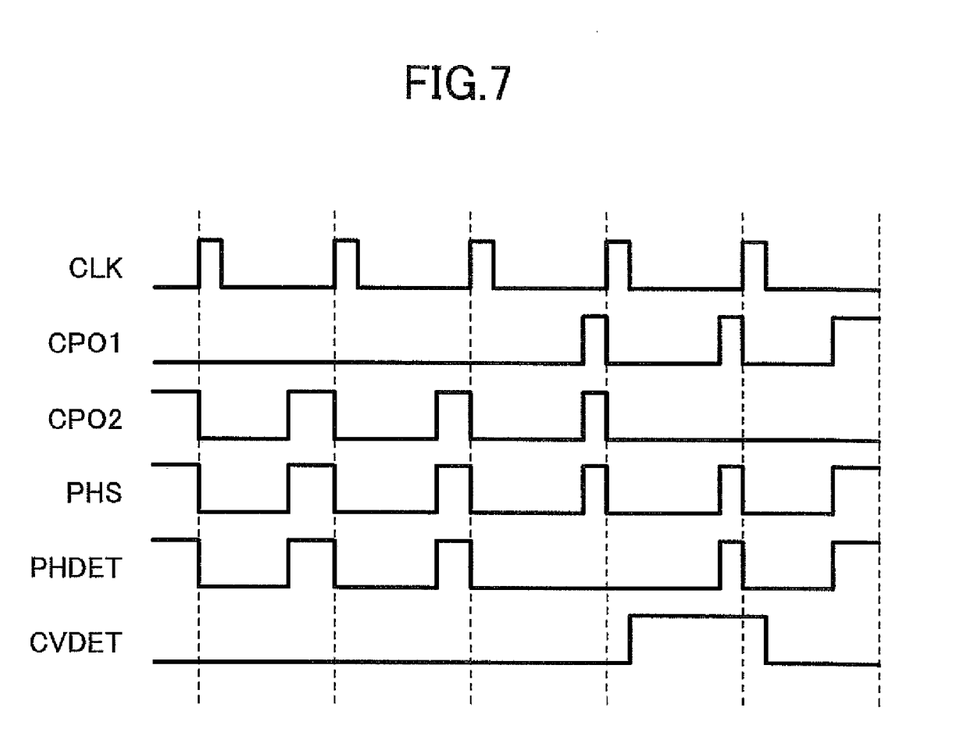
FIG. 7 is a timing chart showing waveform examples of respective signals shown in FIG. 6.

FIG. 7 is a timing chart showing waveform examples of the respective signals shown in FIG. 6. Referring to FIG. 7, a description is made of the operations of the circuit shown in FIG. 6.

When the phase of the signal CPO2 as a constant current control signal and that of the CPO1 as a constant voltage control signal match each other, the constant current/constant voltage switching detection circuit 21 shown in FIG. 6 generates and outputs the signal CVDET of high level. At the time of a complete constant current operation, the signal CPO1 becomes low level, i.e., it has a duty cycle of 100%, and a PWM duty ratio is determined by the signal CPO2. On the other hand, at the time of a complete constant voltage control operation, the signal CPO2 becomes low level, i.e., it has a duty cycle of 100%, and a PWM duty ratio is determined by the signal CPO1. When the signals CPO1 and CPO2 are the same in phase, i.e., they have the same duty cycle, duty ratios at the times of the constant current operations and the constant voltage operations are the same. For this reason, control can be switched from constant current operations to constant voltage operations under the same duty cycle without causing distortions, etc.

Figure 8:
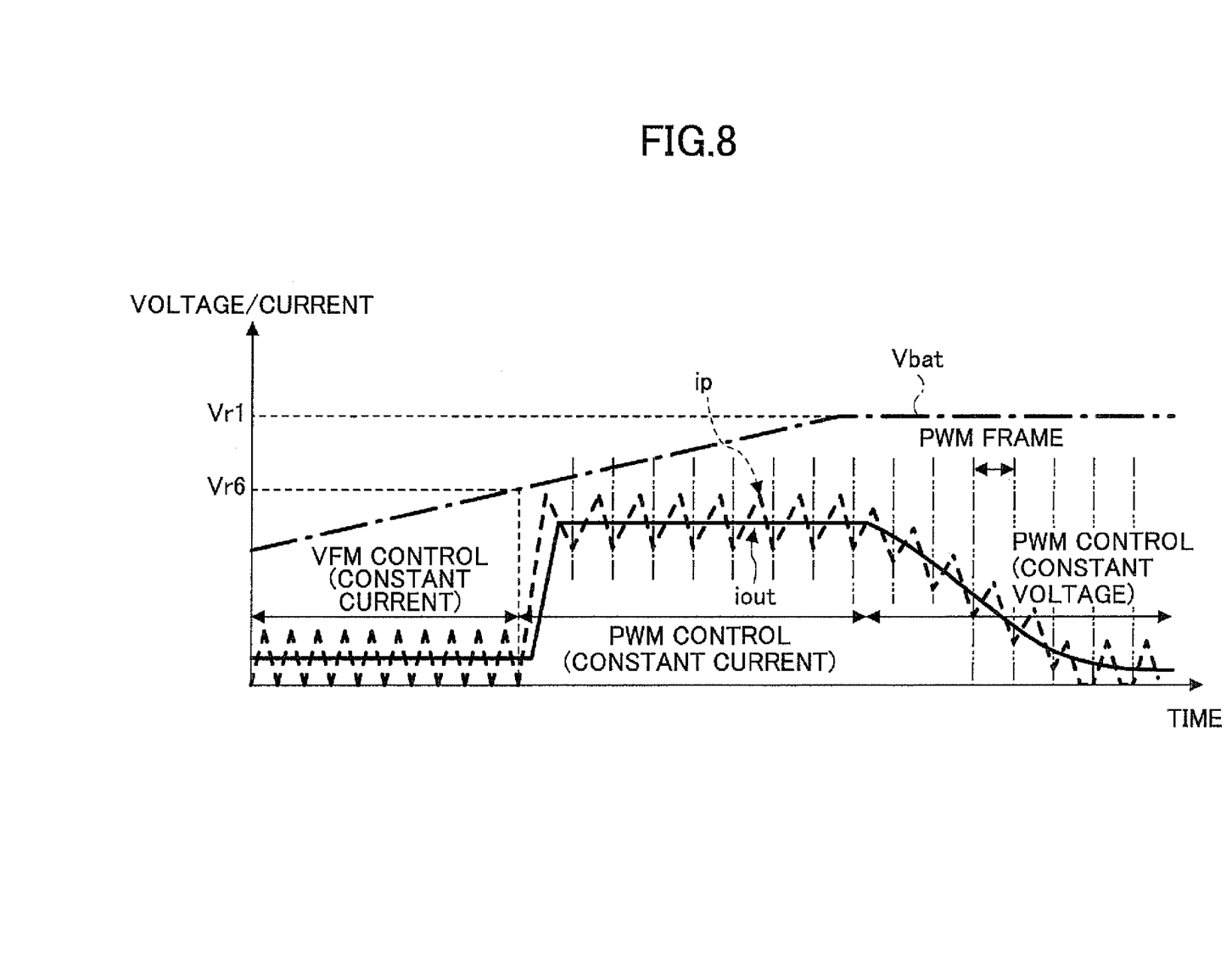
FIG. 8 is a graph showing examples of the operations of the charge control circuit 1 shown in FIGS. 2 through 6.

In such a configuration, FIG. 8 is a graph showing examples of the operations of the charge control circuit 1 shown in FIGS. 2 through 6. Referring to FIG. 8, a description is made of the operations of the charge control circuit 1.

When the battery voltage Vbat is less than the sixth reference voltage Vr6, the control circuit 7 performs a constant current operation in VFM control with respect to the switching transistor M1 and the synchronous rectification transistor M2 using the signals RVDET and CPO3. At the time of a VFM control operation, the control circuit 7 controls the control signal NLS input to the gate of the synchronous rectification transistor M2 using the output signal RVDET from the reverse flow detection circuit 19 and controls the control signal PHS input to the gate of the switching transistor M1 using the signal CPO3 indicating the comparison result of voltages between the third reference voltage Vr3 and the current sense voltage VSNS.

At the time of the VFM control operation, the control circuit 7 controls the inductor current ip to be zero for every switching cycle. Therefore, assuming that the constant current setting value at this time is represented as "iset," it is possible for the control circuit 7 to perform constant current operations at the time of the VFM control operation by defining the third reference voltage Vr3 with the following formula (9).

$$Vr3 = 2 \times iset \times RP/RS \times RV \quad (9)$$

The control circuit 7 brings the control signals PHS and NLS to high levels when the signal CPO3 becomes low level and brings the control signals PHS and NLS to low levels when the signal RVDET, indicating that the output signal from the comparator 14 has become low level, is input from the reverse flow detection circuit 19.

Because the comparator 12 compares the current sense voltage VSNS with the third reference voltage Vr3, the current sense voltage VSNS and the third reference voltage Vr3 have the relationship VSNS=Vr3, and the peak value i1 of the inductor current ip, when the time Ton has elapsed after the switching transistor M1 is turned on, is expressed as the relationship i1=2×iset. Therefore, the control circuit 7 can control the time Ton required for satisfying the above formula (9) and perform the VFM control operation as the constant current operation.

The control circuit 7 performs a constant current operation in PWM control using the signal CPO2 when detecting from the signal CPO4 that the battery voltage Vbat has become equal to or greater than the sixth reference voltage Vr6. For example, the control circuit 7 turns on the switching transistor M1 and at the same time turns off the synchronous rectification transistor M2 when the clock signal CLK rises to a high level, and it turns off the switching transistor M1 and at the same time turns on the synchronous rectification transistor M2 when the signal CPO2 rises to a high level. At the time of a PWM control operation, the control circuit 7 determines a duty ratio by comparing the fourth reference voltage Vr4 from the reference conversion circuit 9 with the current sense voltage VSNS. When the second reference voltage Vr2 is defined by the formula Vr2=2×iset×RP/RS×RV, the fourth reference voltage Vr4 is expressed as follows.

$$Vr4 = Vr2 + (Vr2 - Vp0)$$
$$= 2 \times Vr2 - Vp0$$
$$= 2 \times iset \times RP/RS \times RV - Vp0$$

Note that Vp0 and Vp1 represent the initial value and the last value of the current sense voltage VSNS, respectively, when the switching transistor M1 is turned on.

Assuming that the current value of the inductor current ip when the voltage value is Vp0 is represented as "i0" and an average current flowing to the secondary battery 30 is represented as "iout," the voltage values Vp0 and Vp1 are expressed as follows.

$$Vp0 = i0 \times RP/RS \times RV$$

$$Vo1 = 2 \times iout \times RP/RS \times RV - Vp0$$

Because the constant current setting value iset is equivalent to the output current iout, the fourth reference voltage Vr4 becomes equivalent to the voltage Vp1.

The comparator 11 compares the fourth reference voltage Vr4 with the current sense voltage VSNS and generates the CPO2. Therefore, the following relationships are established.

$$VSNS = Vr4 = Vp1$$

$$ip = i1$$

With the signal CPO2 output from the comparator 11, time until the inductor current ip becomes the peak current value i1 is controlled. Accordingly, it is possible to perform the PWM control operation as a constant current operation with respect to the setting value iset.

Next, when the output signal CVDET from the constant current/constant voltage switching detection circuit 21 becomes high level, the control circuit 7 switches operations control with respect to the switching transistor M1 and the synchronous rectification transistor M2 from the PWM control of the constant current operations to the PWM control of the constant voltage operations. In this case, the control circuit 7 performs the PWM control of the constant voltage operations using the signal CPO1 with respect to the switching transistor M1 and the synchronous rectification transistor M2.

In this case, when the voltage of the error signal ERR is equal to or less than the slope voltage Vs, the comparator 10 outputs the signal CPO1 of low level. In addition, the control circuit 7 turns on the switching transistor M1 to establish an electrical connection and at the same time turns off the synchronous rectification transistor M2 to cut off the electrical connection, while the clock signal CLK is at a high level. On the other hand, the control circuit 7 turns off the switching transistor M1 to cut off the electrical connection and at the same time turns on the synchronous rectification transistor M2 to establish the electrical connection, while the clock signal CLK is at a low level. When the switching transistor M1 is turned on, electrical power is supplied to the inductor L1, the capacitor C1 for smoothing, and the secondary battery 30. As a result, when the switching transistor M1 is turned off to cut off the electrical connection and at the same time the synchronous rectification transistor M2 is turned on to establish the electrical connection, the energy accumulated in the inductor L1 and the capacitor C1 for smoothing is supplied to the secondary battery 30.

When the voltage of the error signal ERR exceeds the slope voltage Vs, the comparator 10 outputs the signal CPO1 of high level. In addition, the control circuit 7 turns off the switching transistor M1 and at the same time turns on the synchronous rectification transistor M2. Therefore, the peak current value i1 of the inductor current ip becomes a value corresponding to the voltage of the error signal ERR.

Thus, when the divided voltage VFB is greater than the first reference voltage Vr1, the voltage of the error signal ERR is increased to thereby reduce the voltage to be supplied to the secondary battery 30. On the other hand, when the divided voltage VFB is less than the first reference voltage Vr1, the voltage of the error signal ERR is reduced to thereby increase the voltage to be supplied to the secondary battery 30. In this manner, the voltage to be supplied to the secondary battery 30 is regulated.

Note that, although the description is not particularly made of an operation using the charge completion detection signal CPO5 to be output from the charging current detection circuit 17, which is performed after the detection of charge completion, the charging operation of the charge control circuit 1 may be stopped by the charge completion detection signal CPO5. Alternatively, the charge completion detection signal CPO5 may be output to outside so that the charging operation is controlled from the outside.

As described above, according to the charge control circuit 1 of the first embodiment, when the control circuit 7 detects from the signal CPO4 that the battery voltage Vbat is less than the sixth reference voltage Vr6, the constant current operation in the VFM control is performed with respect to the switching transistor M1 and the synchronous rectification transistor M2 using the signals RVDET and CPO3. Furthermore, when the control circuit 7 detects from the signal CPO4 that the battery voltage Vbat has become equal to or greater than the sixth reference voltage Vr6, the constant current operation in the PWM control is performed using the signal CPO2. When the output signal CVDET from the constant current/constant voltage switching detection circuit 21 becomes high level, the operation control with respect to the switching transistor M1 and the synchronous rectification transistor M2 is switched from the PWM control of the constant current operations to the PWM control of the constant voltage operations using the signal CPO1. Therefore, the resistors for detecting a charging current are not required, making it possible to reduce the number of parts and eliminate the occurrence of loss due to the current flowing through the resistors. Furthermore, because the switching control is performed both in the constant current mode and in the constant voltage mode where power losses are caused at the time of a boost charge, etc., it is possible to reduce the power losses.

Second Embodiment

In the first embodiment, when the battery voltage Vbat is less than the sixth reference voltage Vr6, the constant current operation in the VFM control is performed using the signals CPO3 and RVDET. Alternatively, a constant current circuit that generates and outputs a predetermined constant current may be provided in the charge control circuit. According to a second embodiment of the present invention, when the battery voltage Vbat is less than the sixth reference voltage Vr6, the constant current circuit supplies a constant current to the secondary battery 30.

Figure 9:
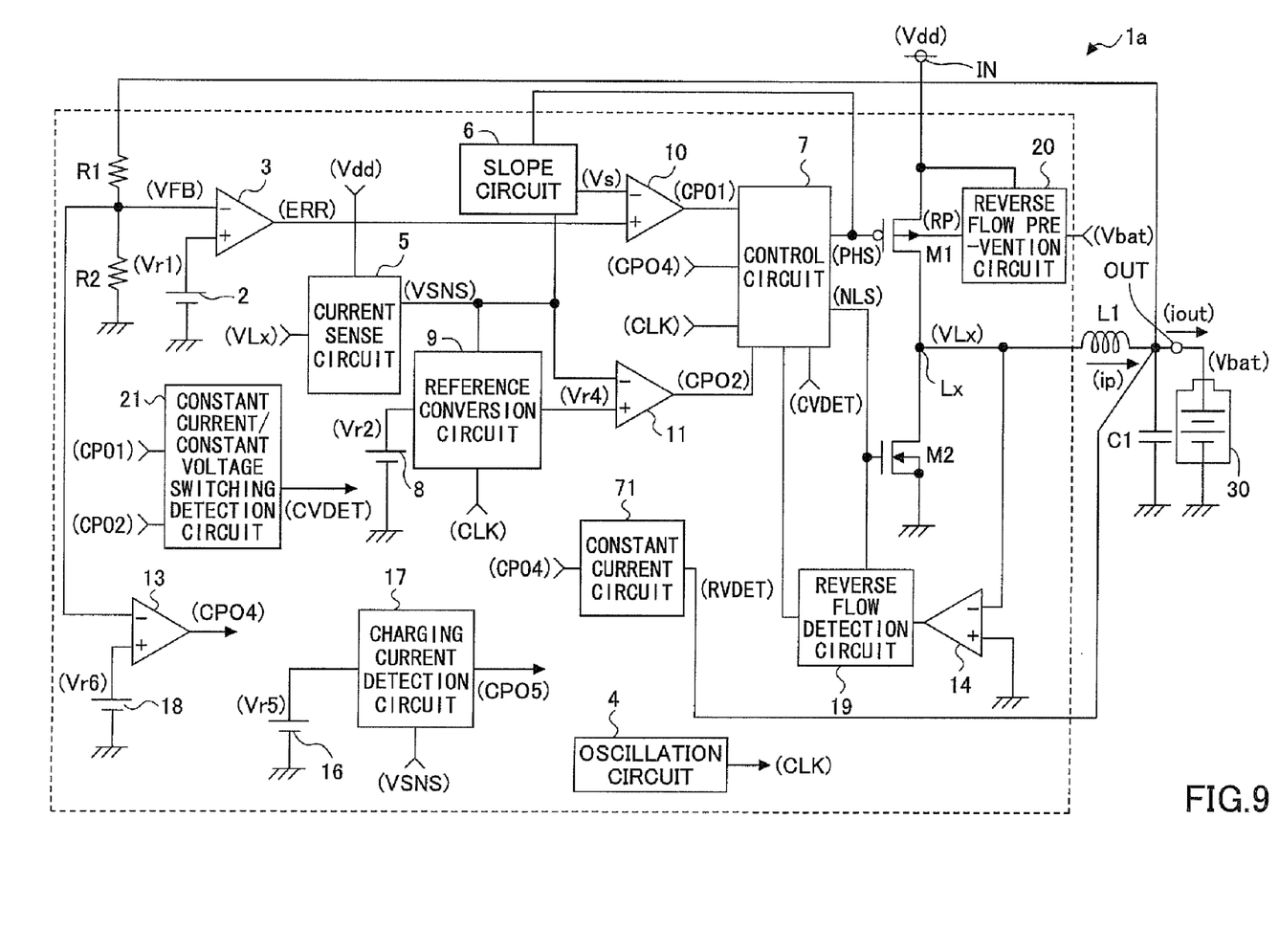
FIG. 9 is a diagram showing a circuit example of a charge control circuit according to a second embodiment of the present invention.

FIG. 9 is a diagram showing a circuit example of the charge control circuit according to the second embodiment of the present invention. Note that in FIG. 9 parts the same as or similar to those of FIG. 2 are denoted by the same reference numerals and a description thereof is omitted. Here, only differences between them are described.

FIG. 9 is different from FIG. 2 in that it eliminates the comparator 12 and the reference voltage generation circuit 15 shown in FIG. 2 but additionally has a constant current circuit 71. Accordingly, the charge control circuit 1 shown in FIG. 2 is shown here as a charge control circuit 1a.

In FIG. 9, the charge control circuit 1a includes a non-insulated step-down switching regulator using the inductor L1 and charges the secondary battery 30 connected to the output terminal OUT using the power supply voltage Vdd input to the input terminal IN from an AC adapter, etc., as a power supply.

The charge control circuit 1a has the switching transistor M1, the synchronous rectification transistor M2, the inductor L1, the capacitor C1, the reference voltage generation circuits 2, 8, 16, and 18, the error amplification circuit 3, the oscillation circuit 4, the current sense circuit 5, the slope circuit 6, the control circuit 7, the reference conversion circuit 9, the comparators 10, 11, 13, and 14, the charging current detection circuit 17, the reverse flow detection circuit 19, the reverse flow prevention circuit 20, the constant current/constant voltage switching detection circuit 21, the resistors R1 and R2, and the constant current circuit 71 that generates the predetermined constant current and supplies the same to the secondary battery 30. Note that in the charge control circuit 1a, the respective circuits excluding the inductor L1 and the capacitor C1 may be integrated together onto one IC.

The signal CPO4 is input to the constant current circuit 71, and the output terminal of the constant current circuit 71 is connected to the positive electrode of the secondary battery 30.

Figure 10:
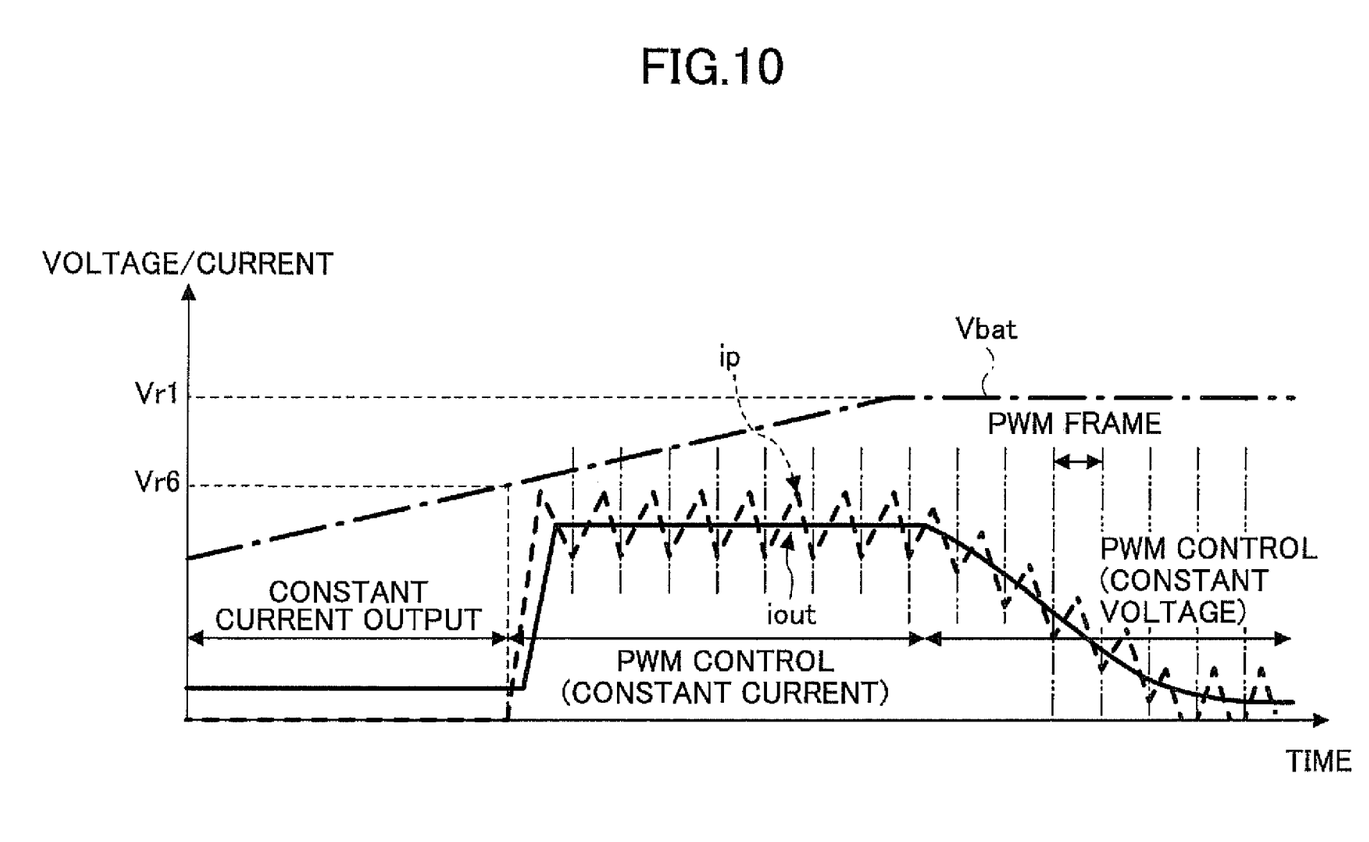
FIG. 10 is a graph showing examples of the operations of a charge control circuit 1a shown in FIG. 9.

In such a configuration, FIG. 10 is a graph showing examples of the operations of the charge control circuit 1a shown in FIG. 9. Referring to FIG. 10, the operations of the charge control circuit 1a are described. Note that, because PWM control of constant current operations and PWM control of constant voltage operations are the same as those of FIG. 2, their descriptions are omitted here.

The constant current circuit 71 supplies the predetermined constant current to the positive electrode of the secondary battery 30 when detecting from the signal CPO4 that the battery voltage Vbat is less than the sixth reference voltage Vr6. At the same time, the control circuit 7 turns off the switching transistor M1 and the synchronous rectification transistor M2 when detecting from the signal CPO4 that the battery voltage Vbat is greater than the sixth reference voltage Vr6.

As described above, according to the charge control circuit 1a of the second embodiment, the secondary battery 30 is charged with the constant current from the constant current circuit 71 when the secondary battery 30 is at a low voltage. Therefore, the same effect as that of the first embodiment can be obtained.

Note that, besides the case in which the synchronous rectification switching regulator is constituted as described in the first and second embodiments, the present invention is also applicable to a case in which an asynchronous rectification switching regulator is constituted. In this case, it is only required to replace the synchronous rectification transistor M2 with a diode whose cathode and anode are connected to the joint Lx and ground potential, respectively.

The preferred embodiments of the present invention are described above, but the present invention is not limited to the above-described embodiments and various modifications and replacements can be added to the above-described embodiments without departing from the scope of the present invention.

The present application is based on Japanese Priority Application No. 2007-231017 filed on Sep. 6, 2007, with the Japanese Patent Office, the entire contents of which are hereby incorporated herein by reference.

The invention claimed is:

1. A charge control circuit that includes a non-insulated step-down switching regulator using an inductor and charges a secondary battery connected to an output terminal using a voltage input to an input terminal as a power supply, the charge control circuit comprising:
    a switching element that performs a switching operation in accordance with an input control signal and charges the inductor with the input voltage;
    a rectification element that discharges the inductor;
    a current detection circuit part that generates a proportional current proportional to a current flowing to the switching element and generates and outputs a current sense voltage corresponding to the proportional current; and
    a control circuit part that performs PWM control for constant voltage output operations with respect to the switching element in accordance with a current mode control method using the current sense voltage at the time of constant voltage charging in which a constant voltage is supplied to the secondary battery for charging, and performs PWM control for constant current output operations with respect to the switching element at the time of constant current charging in which a constant current is supplied to the secondary battery for charging; wherein
    the control circuit part compares the current sense voltage with a fourth reference voltage generated by adding a difference voltage between a second predetermined reference voltage and the current sense voltage to the second reference voltage, and performs the PWM control for the constant current output operations using a pulse signal indicating a comparison result.

2. The charge control circuit according to claim 1, wherein, when performing the PWM control for the constant current output operations, the control circuit part turns on the switching element in accordance with a predetermined clock signal for setting a control cycle of the PWM control to establish an electrical connection and turns off the switching element in accordance with the pulse signal indicating the comparison result to cut off the electrical connection.

3. The charge control circuit according to claim 2, wherein the control circuit part turns off the switching element when the current sense voltage becomes equal to or greater than the fourth reference voltage.

4. The charge control circuit according to claim 3, wherein the control circuit part has:
a switched capacitor circuit that generates the fourth reference voltage from the second reference voltage; and
a second voltage comparison circuit that compares the current sense voltage with the fourth reference voltage.

5. The charge control circuit according to claim 1, wherein, when performing the PWM control using the current mode control method, the control circuit part compares a slope voltage generated by compensating for a slope with respect to the current sense voltage using a predetermined method with a voltage corresponding to a difference voltage between a proportional voltage proportional to a battery voltage of the secondary battery and a first predetermined reference voltage, and performs switching control of the switching element in accordance with a comparison result.

6. The charge control circuit according to claim 5, wherein the control circuit part compares a phase of the pulse signal indicating the comparison result of the fourth reference voltage and the current sense voltage with a phase of the pulse signal indicating the comparison result of the slope voltage and the voltage corresponding to the difference voltage between the proportional voltage and the first reference voltage, and switches from the PWM control for the constant current output operations to the PWM control for the constant voltage output operations when the phases of the pulse signals match each other.

7. The charge control circuit according to claim 5, wherein the control circuit part further has
a proportional voltage generation circuit that generates and outputs the proportional voltage;
an error amplification circuit that amplifies and outputs the difference voltage between the proportional voltage and the first reference voltage;
a slope circuit that generates the slope voltage from the current sense voltage and outputs the slope voltage; and
a first voltage comparison circuit that compares an output voltage of the error amplification circuit with the slope voltage.

8. The charge control circuit according to claim 1, wherein the control circuit part performs VFM control for constant current output operations with respect to the switching element at the time of the constant current charging in which the constant current is supplied to the secondary battery for charging when a voltage of the secondary battery is less than a predetermined value, and performs the PWM control for the constant current output operations when the voltage of the secondary battery is equal to or greater than the predetermined value.

9. The charge control circuit according to claim 8, wherein, when performing the VFM control, the control circuit part compares the current sense voltage with a third predetermined reference voltage and turns off the switching element in accordance with a comparison result, and detects whether an inductor current flowing to the inductor becomes zero and turns on the switching element in accordance with a detection result.

10. The charge control circuit according to claim 9, wherein
the control circuit part turns off the switching element when the current sense voltage becomes equal to or greater than the third reference voltage and turns on the switching element when a voltage of a joint between the switching element and the inductor exceeds a ground potential.

11. The charge control circuit according to claim 10, wherein
the control circuit part further has:
a third voltage comparison circuit that compares the current sense voltage with the third reference voltage; and
a fourth voltage comparison circuit that compares the voltage of the joint between the switching element and the inductor with the ground potential.

12. The charge control circuit according to claim 1, wherein
the control circuit part turns off the switching element to cut off the electrical connection and supplies a predetermined constant current to the secondary battery at the time of the constant current charging in which the constant current is supplied to the secondary battery for charging when the voltage of the secondary battery is less than the predetermined value.

13. The charge control circuit according to claim 12, wherein
the control circuit part stops supplying the constant current to the secondary battery and performs the PWM control for the constant current output operations when the battery voltage of the secondary battery becomes equal to or greater than the predetermined value.

14. The charge control circuit according to claim 1, wherein
the control circuit part detects that the charging of the secondary battery is completed when a value obtained by calculating a square root of an inductor current flowing to the inductor when the switching element is turned on is equal to a value obtained by calculating a square root of a predetermined charge completion current setting value.

* * * * *